United States Patent
Humpert

(10) Patent No.: US 7,657,989 B2
(45) Date of Patent: Feb. 9, 2010

(54) METHOD AND DIE FOR FIXING A FUNCTIONAL ELEMENT TO A PART MADE OF SHEET METAL

(75) Inventor: Richard Humpert, Rosbach v.d.H. (DE)

(73) Assignee: Profil Verbindungstechnik GmbH & Co., KG, Friedrichsdorf (DE)

( * ) Notice: Subject to any disclaimer, the term of this patent is extended or adjusted under 35 U.S.C. 154(b) by 897 days.

(21) Appl. No.: 10/527,038

(22) PCT Filed: Jul. 8, 2003

(86) PCT No.: PCT/EP03/07348

§ 371 (c)(1),
(2), (4) Date: Aug. 17, 2005

(87) PCT Pub. No.: WO2004/024364

PCT Pub. Date: Mar. 25, 2004

(65) Prior Publication Data

US 2006/0150390 A1    Jul. 13, 2006

Related U.S. Application Data

(63) Continuation-in-part of application No. 10/643,126, filed on Aug. 18, 2003, now Pat. No. 7,160,072.

(30) Foreign Application Priority Data

Sep. 9, 2002   (DE) .................... 102 41 701

(51) Int. Cl.
 B21D 39/00  (2006.01)
 B23Q 1/00   (2006.01)
(52) U.S. Cl. ......................... 29/508; 29/283.5
(58) Field of Classification Search ............ 29/505, 29/522.1, 521, 283.5, 432, 509, 238, 243.5, 29/798, 508; 411/180, 181
See application file for complete search history.

*Primary Examiner*—John C Hong
(74) *Attorney, Agent, or Firm*—Hershkovitz & Associates LLC; Abraham Hershkovitz; Eugene C. Rzucidlo

(57) ABSTRACT

Method for the attachment of a functional element having a head end and optionally a shaft part, in particular a fastener element, to a sheet metal part, optionally in liquid-tight and/or gas-tight form, wherein the functional element is pressed against the sheet metal part supported by a die button having a shaping space and sheet metal material is pressed by means of at least one movably mounted shaped part, and preferably by means of at least two such shaped parts of the die button, and by a radially inwardly directed movement of the or each shaped part, into an undercut of the functional element, with the or each shaped part forming a respective wall region of the shaping space, wherein the or each shaped part is initially radially supported by an envelope surface region of an abutment envelope and is prevented from a radially inwardly directed movement so long until the sheet metal material is drawn by the head end of the functional element into the shaping space for the formation of a pronounced recess at least largely surrounding the head end and is only then released by an axial movement of the envelope surface region of the abutment element past the or each shaped part for the radial movement for the pressing of the sheet metal material into the undercut.

26 Claims, 3 Drawing Sheets

METHOD AND DIE FOR FIXING A FUNCTIONAL ELEMENT TO A PART MADE OF SHEET METAL

CROSS REFERENCES TO RELATED APPLICATIONS

Figure 1:
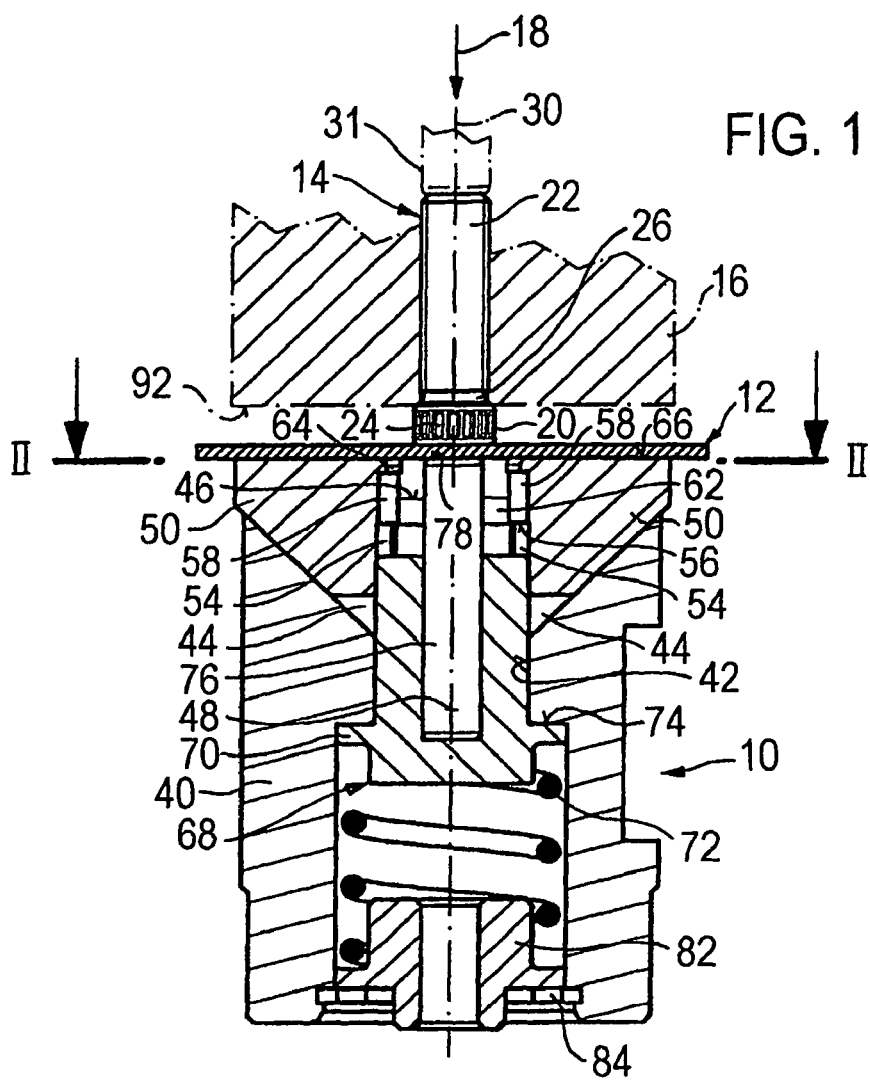

This application claims priority from PCT/EP03/07348 filed on Jul. 8, 2003 and is a continuation-in-pan of U.S. patent application Ser. No. 10/643,126 filed Aug. 18, 2003 now U.S. Pat. No. 7,160,072.

The present invention relates to a method for the attachment of a functional element having a head end and optionally a shaft part, in particular a fastener element, to a sheet metal part, optionally in liquid-tight and/or gas-tight form, wherein the functional element is pressed against the sheet metal part supported by a die button having a shaping space and sheet metal material is pressed by means of at least one movably mounted shaped part, and preferably by means of at least two such shaped parts of the die button and by a radially inwardly directed movement of the or each shaped part, into an undercut of the functional element, with the or each shaped part forming a respective wall region of the shaping space. Furthermore, the invention relates to a die button, in particular for use in such a method for the attachment of a functional element having a head end and optionally a shaft part, in particular a fastener element, to a sheet metal part, optionally in liquid-tight and/or gas-tight form, wherein the die button has a die button body with at least one shaped part movably mounted therein, preferably at least two such shaped parts and also a biased abutment element for the or each shaped part at the centre of the die button body and wherein the or each shaped part forms a wall region of a shaping space which is provided in the die button in the region of its end face confronting the sheet metal part and is guided by a respective obliquely positioned guide track for a radially inwardly directed movement, which leads to the sheet metal material being pressed into a feature of shape, i.e. into an undercut of the functional element.

A method and a die button of this kind is known from European patent application 99 120 559.2. There a method of this kind and a die button of this kind are used in order to attach different functional elements to a sheet metal part. For example, the functional element can be an element in accordance with FIGS. 1a and 1b there, where the head part has a larger diameter than the shaft part and an undercut is formed between the head part and shaft part. Furthermore, the functional element can be an element which presents itself, in accordance with FIG. 5 there, as a threaded pin with at least substantially constant diameter. In this connection features providing security against rotation can be provided in the region of the head end of the threaded pin. Alternatively to this, the functional element can be an element in accordance with the German patent application 10118973.7. Furthermore the functional element can be an element which presents itself as a hollow tube element or is formed in accordance with the European patent application EP 02012625.6. Furthermore, the functional element can simply represent a nut element, with the nut body so to say forming the head part of the element.

Important with respect to the shape of the functional element is that one or more undercuts or features of shapes such as recesses exist in the region of the head part or of the part of the element, which is surrounded by the sheet metal part, which are present for a form-fitted engagement with the sheet metal material in the region of a recess of the sheet metal part which forms an attachment of the functional element to the sheet metal part. It is not necessary that the functional element is equipped with a thread. The functional element can, straightforwardly, be an element which is, for example, formed as a guide pin or has a spherical head or is equipped with special features in order to carry out specific functions. As a further example, one can name here a pin which serves in a car to receive a spring clamp for the attachment of a carpet or a brake-line clip or a cable clip.

Furthermore, the functional element can be a hollow body element such as a nut element with our without an internal thread, which itself represents the head part and does not necessarily have a shaft part. The undercut will then, for example, be realized at the transition from the side wall of the element into its exposed end face or by this transition.

It is known to attach functional elements by various methods and using different die buttons to sheet metal parts on an industrial scale. This frequently takes place at the same time as the deformation of the sheet metal part to form a three-dimensional article. It is problematic in all such methods and die buttons that they have to operate reliably over long series.

One problem in the manufacture of sheet metal parts which have a recess in which the head part or a functional element is received in form-fitted manner lies in the fact that the previously known methods or die buttons occasionally lead to a faulty formation of the recess, for example in the sense that the recess is not symmetrically shaped.

BRIEF SUMMARY OF THE INVENTION

The object of the present invention is to so further improve a method or a die button of the initially named kind that the method and the die button operate more reliably and undesired asymmetries or faulty formations of the sheet metal part do not arise, or at most only arise extremely rarely.

In order to satisfy this object provision is made method-wise in accordance with the invention that the or each shaped part (50) is prevented from a radially inwardly directed movement so long until the sheet metal material is drawn by the head end of the functional element into the shaping space for the formation of a pronounced recess at least largely surrounding the head end and is only then released for the radial movement for the pressing of the sheet metal material into the undercut.

Furthermore, a die button is provided in accordance with the invention which is characterized in that the abutment element is biased in the direction towards the sheet metal part, in that each shaped part is supported on the abutment element during the formation of a recess in the sheet metal part, which takes place in the shaping space of the die button by pressure exerted onto the head end of the functional element and is hereby prevented from the radially inwardly directed movement so long until the region of the abutment element against which each shaped part is supported is moved by the said pressure from the head end of the functional element against the bias passed the shaped part and has released the radial movement of the shaped part.

Since the shaped part or the shaped parts are first immovably held by contact against the abutment element clearly defined conditions for the formation of the recess are present so that one succeeds in forming the recess in an orderly manner without faulty shapes of the recesses having to be feared. Furthermore, the radial movements of the shaped parts which cause the sheet metal material to be pressed into the features of shape or into the undercut of the functional element, are so synchronized by the selected method or by the die button designed in accordance with the invention that a symmetrical deformation of the sheet metal material takes place in the region of the recess around the head end of the functional element, whereby a symmetrical formation of the connection between the sheet metal part and the functional element likewise takes place, without faulty shapes of this connection having to the feared.

Depending on how the functional element is designed the shaped parts can be rounded in accordance with claim 2 at their surfaces confronting the sheet metal material, at the transition to the wall sections forming the shaping space and the said wall sections can press the sheet metal material into features of shape in the radially outer side of the head end of the functional element. Should an undercut be present at the functional element, at the head part or between the head part and the shaft part, then, at their surfaces which confront the sheet metal material, at the transition into the wall sections which form the shaping space, the shaped parts can have rounded, radially inwardly directed projections which press the sheet metal material into the undercut. Here the rounded shape also serves for the more careful treatment of the sheet metal part so that it is not perforated or pierced.

The method of the invention and the die button of the invention are particularly simply designed when the shaped parts are prevented from their radially inwardly directed movement by an abutment element of the die button which is biased in the direction towards the sheet metal part and on which they are supported and when the abutment element is urged rearwardly by the head end of the functional element through the inter-mediary of the sheet metal material during the formation of the recess until the support of the shaped parts on the abutment element is removed.

Thus, with a relatively simple design of the abutment element, the abutment element of the die button is urged back during formation of the recess in the sheet metal part until the shaped parts are no longer supported on the abutment element and can move, as a result of the pressure exerted on to the end faces of the shaped parts confronting the sheet metal part, along the obliquely positioned guide tracks. This movement also takes place in synchronized manner because the sheet metal part is simultaneously pressed by the plunger or the setting head onto the end faces of all shaped parts at the same time and itself takes care of the synchronized movement of the shaped parts along the respectively associated, obliquely positioned, guides. Since the shaped parts are moved by the same amount in the axial direction under the action of the setting head which presses against the sheet metal part they all likewise move by the same radial amount in the radial direction because the guide tracks all form the same angle with the longitudinal axis of the die button. In the region of the shaped parts the die button is particularly intimately brought into engagement with features providing security against rotation formed at the functional element, in particular groove-like and/or knurled-type features, whereby a particularly secure security against rotation takes place.

It is particularly favourable when, for the shaped parts, respective guide tracks resembling T-grooves inclined to the longitudinal axis of the die button are provided in which the shaped parts, after the release of the radially inwardly directed movement slide under the pressure of a plunger and simultaneously carry out the above-mentioned axial and radial movement. The shaped parts can also have the shape of T-groove stones in cross-section, whereby a particularly favourable guidance of these shaped parts takes place.

It is particularly favourable when the shaping space of the die button is not only formed by the wall regions of the movably mounted shaped parts but is rather also formed by the fixedly arranged wall regions of the body of the die button which are each arranged between two movable shaped parts of the die button.

The fixedly arranged wall regions of the die button body are preferably so designed in the starting state for the manufacture of the recess in the sheet metal part that they are aligned with or fractionally set back relative to the wall regions of the shaped parts which co-define the shaping space whereas, in the closed state of the die button, after the completion of the connection between the functional element and the sheet metal part, they are significantly offset relative to the wall regions of the shaped parts which co-define the shaping space.

This signifies that during the closing movement of the die button the sheet metal material is particularly intensively deformed in the region of the shaped parts in the vicinity of the recess, but are, in contrast, if anything little deformed in the regions between the shaped parts. This alternating deformation of the sheet metal material in the region of the recess leads to an extremely favourable security against rotation.

The method is normally so carried out that the sheet metal part is not perforated, whereby a gas-tight and liquid-tight connection is possible between the functional element and the sheet metal part. This can in particular be of advantage, when the functional elements are incorporated into a floor pan of a vehicle or in regions where water or salt solution can come into contact with the sheet metal part from the outside. As a result of the sheet metal part not being perforated no possibility exists for such a liquid to pass from the outer side of the sheet metal part to the inner side of the sheet metal part through the connection between the functional element and the sheet metal part and cause corrosion there.

The invention is however not restricted to manufacturing connections in which the functional element does not penetrate the sheet metal part. Instead of this it is entirely possible to operate with a holed sheet metal and to form the recess in the region of the hole of the sheet metal or, on formation of an initially non-holed recess in the sheet metal part, to pierce this with a follow-up hole punch. A construction of this kind could for example be of advantage when the functional element is a nut element, or if one desires to have access to the thread from the side of the sheet metal part remote from the functional element, or wishes to create a situation in which a screw can be screwed through a nut element and through the sheet metal part, which could for example be expedient if one operates with a thread forming or thread cutting screw, which simultaneously produces a thread in the sheet metal part and hereby provides a conductive transition between the screw and the sheet metal part, for example when the screw is a grounding bolt or other electrical connection.

Particularly preferred embodiments of the method and of the die button can be found in the subordinate claims.

The invention will be explained in more detail in the following with reference to a preferred embodiment and with reference to the drawings in which are shown:

BRIEF DESCRIPTION OF THE SEVERAL
VIEWS OF THE DRAWINGS

Figure 2:
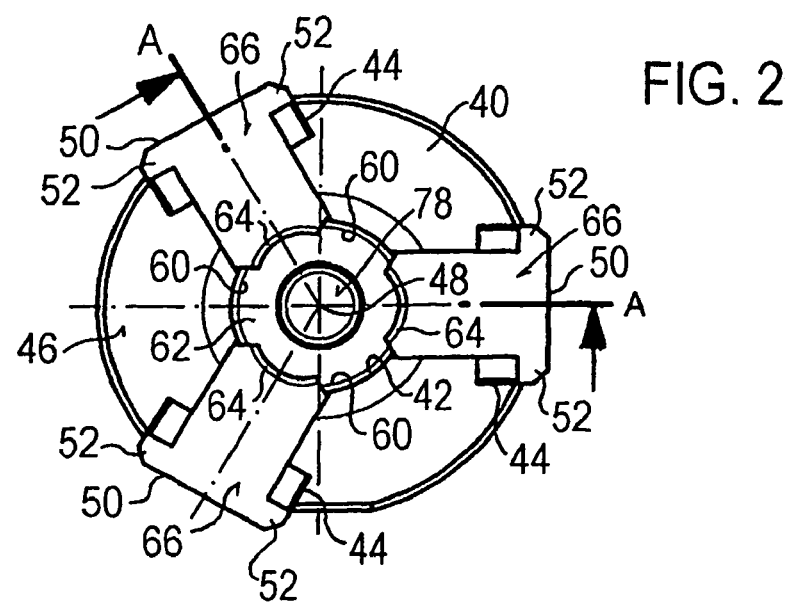
Figure 3:
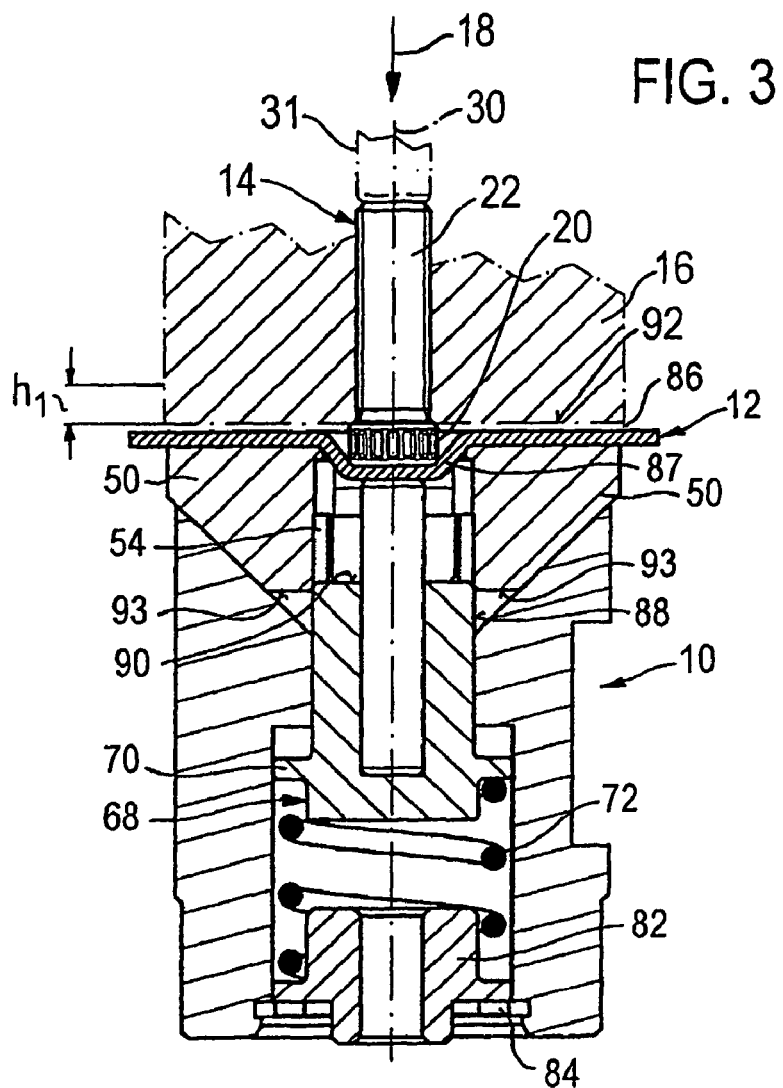
Figure 4:
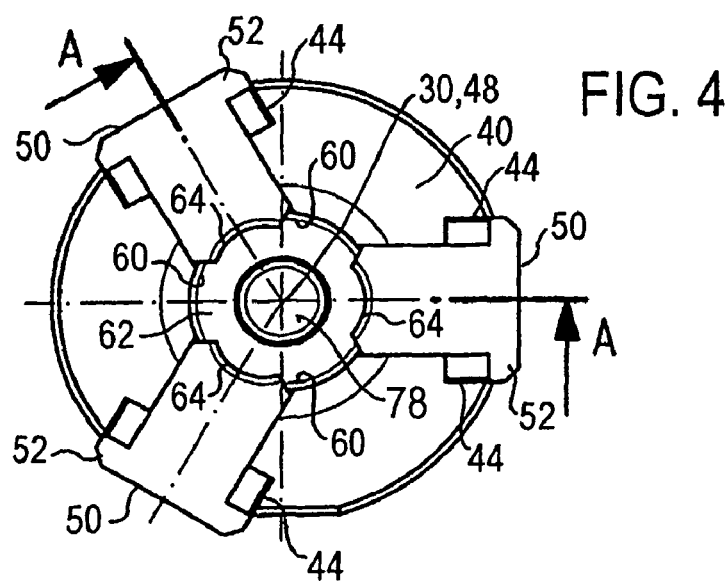
Figure 5:
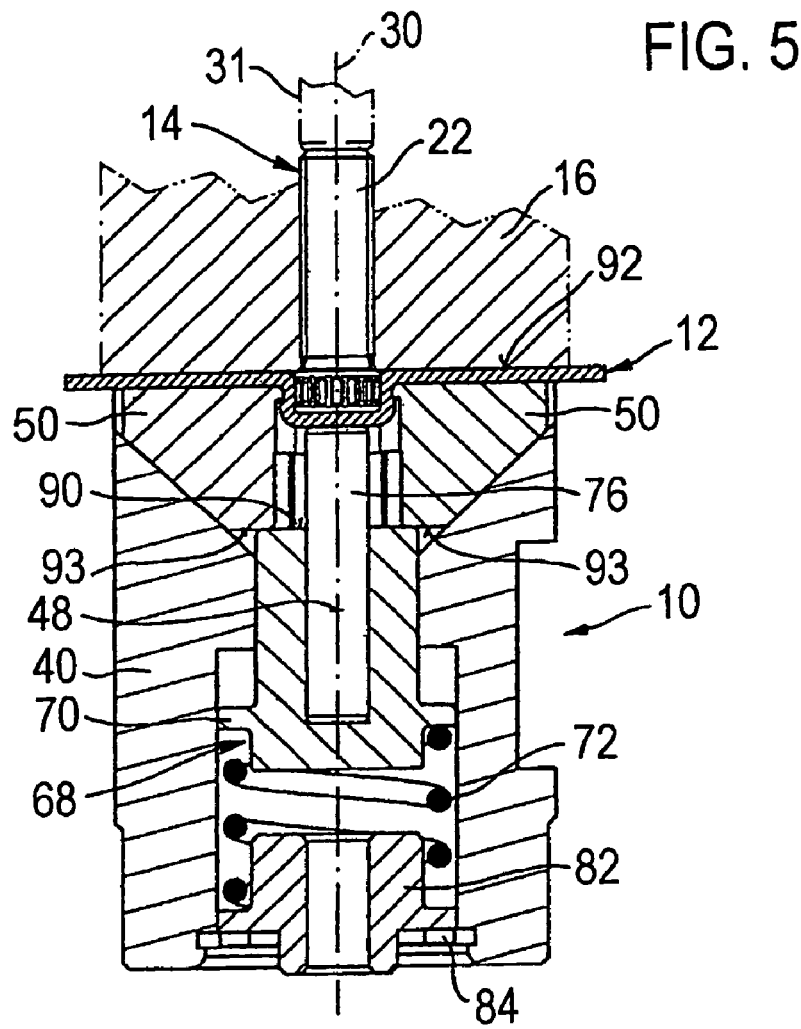
Figure 6:
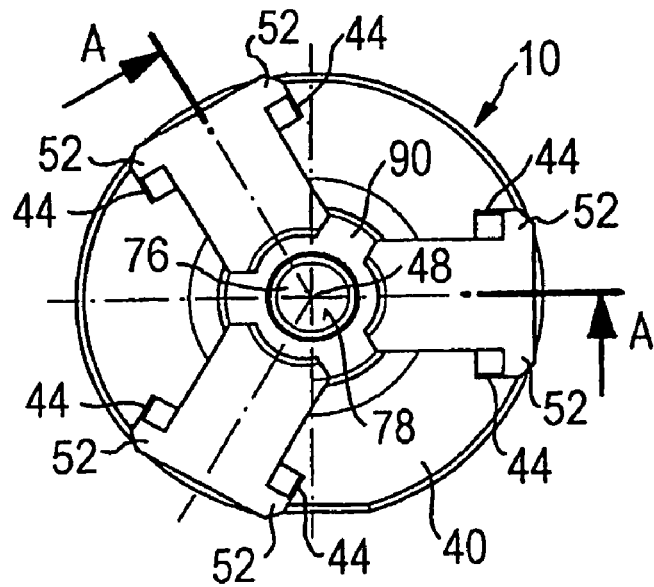

FIG. 1 a longitudinal section through a die button in accordance with the invention which is intended for use with a setting head for the attachment of a functional element to a sheet metal part, with the section plane of FIG. 1 being given as A-A in FIG. 2, FIG. 2 a plan view of the die button of FIG. 1 in accordance with the plane II-II in FIG. 1, FIGS. 3 and 4 representations which correspond to FIGS. 1 and 2 but after a closing movement of a press, in which the setting head and the die button are incorporated, with a recess being formed in a sheet metal part and the formation of the recess standing shortly before its completion, and FIGS. 5 and 6 further representations corresponding to FIGS. 1 and 2 and 3 and 4 respectively, but at the end of the attachment process at a point in time when the functional element is fully attached to the sheet metal part.

DETAILED DESCRIPTION OF THE PREFERRED EMBODIMENT

Referring first of all to the FIGS. 1 and 2 a die button 10 is shown there which is arranged beneath a sheet metal part 12, with a functional element 14 above the sheet metal part being moved by a schematically illustrated setting head towards the sheet metal part in the direction of the arrow 18 and with the lower end face of the functional element consisting of head part 20 and shaft part 22 just having contacted the sheet metal part 12.

As is evident from FIG. 1 the head part 20 of the functional element 14 is larger in diameter than the diameter of the shaft part 22, which in this example is provided with a thread. Furthermore, the head part 20 of the functional element has a plurality of radial recesses 24 which are uniformly arranged around the periphery of the head part 20. In this example twelve such uniformly distributed recesses are provided which each have the shape of a rectangle with rounded corners in plan view. Furthermore, one can see from FIG. 1 that the head part 20 of the functional element 14 merges via a radial shoulder 26 into the shaft part 22 provided here with thread. At this point it should be emphasized that this only represents one possible design of the functional element 14. The functional element can have the most diverse forms as was explained in more detail above.

The setting head 16 can be any desired setting head. The setting head must only be in a position to receive the functional element 14 and to press this in the direction towards the die button 10. In the illustration of FIG. 1 the setting head 16 presses both on the radial shoulder 26 of the functional element and also onto the free end face of the shaft part 22, with it being possible for a spring-loaded pin 31 to be used here. This spring-loaded pin 31 can also be retracted in order to permit the automatic feeding of further separated functional elements.

The setting head can for example be designed in accordance with the European patent application 96 109 214.5 in accordance with the European application 00 947 949.4 or the corresponding divisional application 02 012 625.6 or in accordance with the European patent application 00 931 155.6.

Furthermore, a ring-like spring-loaded hold-down member can be provided which is not shown in FIG. 1 but which would be arranged in ring-like manner around the central longitudinal axis 30 of the setting head 16, which simultaneously represents the central longitudinal axis of the functional element 22 and of the die button 10, and would have the task of pressing the sheet metal part against the upper end face of the die button 10.

The design of the die button 10 is to be understood as follows: the reference numeral 40 points to a die button body which is formed with a central stepped bore 42 arranged concentric to the longitudinal axis 30. Furthermore, in this example, three inclined T-groove-like guide tracks 44 are milled or eroded into the die button body, with each inclined guide track 44 coming from the upper end face 46 of the die button body 40 and being directed towards a common central point 48 on the central longitudinal axis 30. The three guide tracks 44 shown in FIG. 2 are arranged at uniform intervals around the central longitudinal axis 30 and each have the same inclination to the central longitudinal axis. In this example three movable shaped parts of the die button 10, which have an approximately triangular shape in side view, and which each have the cross-section of a T-groove stone perpendicular to the respective guide track, are displaceably mounted in the guide tracks resembling T-grooves.

The shaped parts 50 accordingly have two shoulder regions 52 which slide in the guide tracks 44 resembling a T-groove, whereby the freedom of movement of the shaped parts 50 is restricted to an movement in the longitudinal direction of the guide tracks, i.e. in the inclined direction towards the centre point 48. At its radially inner side each shaped part 50 has a part-cylindrical surface 54 which merges via a small radial shoulder 56 into a likewise partly cylindrical wall section 58. These wall sections 58 of the shaped parts 50, together with fixedly arranged cylindrical sections 60 of the die button body, form a shaping space 62. In this arrangement the fixed wall sections 60 of the die button 40 extend along a circular cylinder which is disposed concentrically to the central longitudinal axis 30.

As is likewise evident from FIGS. 1 and 2 the shaped parts 50 have, in the region of their upper end faces 66, respective radially inwardly directed rounded projections 64 which—as will be later explained in more detail—serve to press the sheet metal material into the recesses or undercuts 24 of the functional element 22. At this point expression should be given to the fact that the radially inwardly directed projections 64 are not necessarily required. Instead of this the cylindrical wall sections 58 could merge via a radius or gently rounded portions into the end face of the respective shaped part 50, i.e. without such a radially inwardly directed projection 64. A design of this kind would be of advantage, when the functional element has an at least substantially constant diameter and would, for example, be realized as a threaded pin, with the shaped parts 50 then having the task of pressing the sheet metal material at points around the periphery of the threaded pin or around the entire periphery of the threaded pin into the thread or into knurling which is impressed onto the thread or replaces it.

A movably mounted abutment element 68 is likewise evident from FIG. 1 which has a flange 70 with a compression coil spring 72 engaging the underside of the flange in order to bias the abutment element 68 upwardly. In this arrangement the upper side of the ring flange 70 enters into contact with a ring shoulder 74 of the stepped bore 42 of the die button 40 and this limits the possible upwardly directed movement of the abutment element 68. The abutment element 68 furthermore has a centrally arranged pin 76, the upper end face 78 of which lies in the plane of the end faces 66 of the shaped parts 50, with this plane standing perpendicular to the longitudinal axis 30. Furthermore, one notes from FIG. 1 that the upper end face 46 of the die button body 42 is set back from the end faces 66 of the shaped parts 50.

The compression coil spring 72 is supported at its end remote from the abutment element 68 on an abutment 82 which is held in the die button body 40 by means of the spring ring 84.

The FIGS. 1 and 2 show the starting position of the die button 10 of the setting head 16 directly before the start of the attachment of the functional element 22 to the sheet metal part. In this arrangement the die button 10 is normally arranged in a lower tool of a press, whereas the setting head 16 is carried by an upper tool of the press or by an intermediate plate of the press. Other arrangements are also possible. For example, the die button can be carried at the intermediate plate of the press or by an intermediate plate of the press. Further arrangements are also possible. Inverse arrangements are also possible in which the die button is attached in the upper tool of the press and the setting head in the lower tool of the press or at the intermediate plate. The provision of a press for the actuation of the tools comprising the setting head and the die button is however not compulsory. Thus, for example, arrangements are possible in which the die button and the setting head are carried by a robot in order to realize the required relative movement between the setting head and the die button in the direction of the longitudinal axis of the functional element, with this relative movement either taking place by the robot itself or by the action of force from the outside. Other tools are also conceivable which could take care of the required relative movement of the setting head and the die button.

The designations top, bottom etc. which are used in the description refer to the geometrical arrangement of FIGS. 1 and 2 and are not however to be regarded as restrictive. With a different geometrical arrangement, for example with the die button at the top and the setting head at the bottom the designations of the positions used should be interpreted accordingly. Finally oblique arrangements of the die buttons and the setting head are also entirely conceivable.

The attachment of the functional element 14 to the sheet metal part 12 will now be described in more detail with reference to the further FIGS. 3 to 6.

FIG. 3 shows the state after the press has partly closed, i.e. the setting head 16 has already been moved in comparison to FIG. 1 by the amount $h_1$ in the direction of the arrow 18 in the direction towards the die button 10. The press is not yet fully closed, which is evident from the spacing 86 between the lower side of the setting head 16 and the sheet metal part 12. During this closing movement of the press the setting head has exerted a pressure on the functional element 22 so that the head part 20 of the functional element has produced a recess 87 in the sheet metal part 12 which is located within the shaping space 62.

During this movement of the setting head the shaped parts 50 are immovably held because they are prevented from movement along the guide track 22 by the contact of the cylindrical surfaces 54 against the outer cylindrical surface 88 of the abutment element 68. One notes from FIG. 3 that this contact of the part-cylindrical surfaces 54 against the cylindrical surface 88 is just about to be removed because the abutment element 68 has been urged rearwardly as a result of the pressure exerted by means of the functional element 22 via the sheet metal part 12 on the central pin 76 to such a degree that the ring surface 90 of the abutment element, which surrounds the central pin 76 and represents the upper end face of the cylindrical part 88 of the abutment element will soon come to lie below the lower end faces 93 of the shaped parts 50.

If it is assumed that a further closing movement of the press leads to the underside 92 of the setting head 16 pressing against the sheet metal part 12, with the ring surface 90 of the abutment element 68 now lying below the lower sides 93, then the shaped parts 50 can now move from the position of FIG. 3 into the radial inwardly displaced positions in accordance with FIG. 5. They are forced to do this because the force of the setting head acting in the arrow direction 18 bears on the sheet metal part and thus on the upper end faces 66 of the shaped parts 50.

This force forces the shaped parts 50 to move along the inclined guide tracks, with them no longer being prevented from this movement by the abutment element 68, because the ring surface 90 lies below the end faces 93 of the shaped parts 50. This movement continues until the position of FIG. 5 is reached. One sees here that the recess formed in accordance with FIG. 3 has now been pressed firmly against the head part 20 of the functional element at three points by the radially inwardly directed movement of the shaped parts which is associated with the movement along the inclined guides 44, with the radially inwardly projecting noses 64 of the shaped parts 50 having pressed the sheet metal material into the oppositely disposed features of shape or undercuts of the head part of the functional element, so that a firm contact of the sheet metal part against the head part 20 of the functional element 22 is present. Through the engagement of the sheet metal material into the recesses 24 a high security against rotation and also high resistance to press-out is produced. The connection between the functional element 14 and the sheet metal part 12 is now finished and the component assembly comprising the sheet metal parts and the functional element attached thereto can now be removed by opening of the press from the latter. In this arrangement, on opening of the press, the upwardly directed force exerted by the spring 72 on the abutment element, which acts via the central pin 76 on the component assembly comprising the functional element 14 and the sheet metal part, serves to push the component assembly upwardly whereby the shaped parts 50 are co-lifted, in particular, because the radially inwardly directed projections engage into the sheet metal material. This lifting movement takes place until the cylindrical part of the abutment element can slide between the shaped parts again in the region of the cylindrical surfaces 54. At this point in time the die button is opened again and the shaped parts are moveable radially outwardly and upwardly to such an extent that the component assembly can be removed and a new sheet metal part can be introduced into the press in order to be connected to a new functional element.

The lifting of the component assembly 12, 14 out of the die button 10 can also take place at least partly by the setting head if the latter exerts forces on the shaft part 22, such as for example in the setting head of the European application 02 012 625.6. As a result of the form-fitted connection between the head part 20 and the sheet metal part 12 these forces lift the shaped parts 50 and force them to a radially outwardly directed movement, which takes place as a result of the inclined guide tracks until the component assembly is released by the shaped parts. The setting head must however then be so designed and controlled that it subsequently releases the shaft part and thus the component assembly.

Since the stationary wall sections 60 of the die button body 40 are of circularly cylindrical shape no deformation of the sheet metal part is possible in these regions which would prevent the removal of the component assembly from the press. Moreover, one notes from FIGS. 5 and 6 that the closing movement of the press is automatically terminated when the setting head 16 has pressed the sheet metal part 12 onto the upper end faces 66 of the shaped parts 50 and onto the upper end face 46 of the die button body. In this state the press is blocked and cannot close further, or this blockage is recognized by the press control and leads to opening of the press. This firm contact also restricts the maximum radially inwardly directed movement of the shaped parts and ensures that the pressing of the sheet metal part onto the functional element in the radial direction takes place by the desired amount. The delay of movement of the shaped parts 50 until the recess has formed in the sheet metal part ensures a symmetrical formation of the sheet metal part and the synchronized movement of the shaped parts which, as a result of the mechanical design, then occurs when the abutment element 68 has been pushed backwardly to such an extent that the shaped parts can move axially and radially, likewise ensures a clean symmetrical deformation of the sheet metal part 12.

At this point it should be brought out that, although the preferred arrangement envisages three movable shaped parts 50 it would also be conceivable to operate with two shaped parts or indeed with only one movable shaped part, with another number of shaped parts also being able to be selected if required, for example four, five, six or more. It would also be conceivable to dispense with the stationary wall sections for the bounding of part segments of the shaping space and to allow the sheet metal part to be pressed around the entire periphery of the recess by shaped parts movable in the radial direction. It is however regarded as directly advantageous that the sheet metal part in the region of the recess is pressed firmly against the functional element 14 locally, because this can take place to such an extent that the functional element is also deformed in these regions, in the region of the locally deformed sheet metal parts, but is not deformed in the regions which are preset by the stationary wall regions of the die button body. This likewise leads to a security against rotation and indeed even when no features providing security against rotation are provided at the head part. In other words, the movable shaped parts can then lead to a local indentation of the head part of the functional element, with the sheet metal material being deformed into the local indentation and taking care of the required security against rotation. The inter-engaging regions of the functional element 14 and the sheet metal part 12 also take care in this example of the required pullout resistance of the functional element.

Moreover the arrangement can be so contrived that an undercut is present between the head part and the shaft part of the functional element, for example in the region of the ring shoulder 26 with the sheet metal material being able to be pressed into this undercut and a pullout resistance being hereby achieved.

Finally one notes from a comparison of FIG. 6 with FIGS. 2 and 4 that the radially inwardly directed movement of the shaped parts 50 in FIG. 6 has led to the stationary wall sections 60 being set back by a pronounced amount relative to the part-cylindrical surfaces 58, whereas this is not the case in FIGS. 2 and 4, because there the cylindrical surfaces 58 of the shaped parts 50, are, if anything, aligned with the partly cylindrical surfaces 60 of the die button body 40.

The invention claimed is:

1. Method for the attachment of a functional element (14) having a head end (20) and optionally a shaft part (22) to a sheet metal part (12), optionally in liquid-tight and/or gas-tight form, wherein the functional element is pressed against the sheet metal part (12) supported by a die button having a shaping space (62) and sheet metal material is pressed by means of at least one movably mounted shaped part (50), and preferably by means of at least two such shaped parts (50) of the die button, and by a radially inwardly directed movement of the or each shaped part, into an undercut of the functional element (14), with the or each shaped part forming a respective wall region of the shaping space (62), wherein the or each shaped part (50) is initially radially supported by a surface (88) of an abutment element and is prevented from a radially inwardly directed movement so long until the sheet metal material is drawn by the head end (20) of the functional element (14) into the shaping space (62) for the formation of a pronounced recess (87) at least largely surrounding the head end and is only then released by an axial movement of the surface (88) past the or each shaped part for the radial movement for the pressing of the sheet metal material into the undercut.

2. Method in accordance with claim 1, wherein the or each shaped part (50) is rounded at the surfaces (66) facing the sheet metal material at a transition into the wall section (58) forming the shaping space (62) and in that a wall section presses the sheet metal material into features of shape (24) at a radially outer side of the head end of the functional element.

3. Method in accordance with claim 1, wherein the or each shaped part (50) has at its surfaces confronting the sheet metal material, at the transition into the wall section forming the shaping space, a rounded radially inwardly directed projection (64) which presses the sheet metal material into an undercut formed at the head end (20) of the element (14), or at a transition from the head end (20) of the functional element (14) into the shaft part (22).

4. Method in accordance with claim 1, wherein the abutment element is urged back by the head end (20) of the functional element (14) through an intermediary of the sheet metal material (12) during the formation of the recess (87) until the support of the or each shaped part at the abutment element is removed.

5. Method in accordance with claim 1, wherein after freeing of the radially inwardly directed movement the shaped parts (50) slide under pressure of a plunger on respective guide tracks (44) inclined to the longitudinal axis (30) of the die button and are thus simultaneously moved axially and radially.

6. Method in accordance with claim 4, wherein after the attachment of the functional element (14) to the sheet metal part (12), the shaped parts (50) are moved in the axial direction by the biased abutment element (68), with a component assembly formed by the functional element and the sheet metal part, which is also axially moved by the abutment element (68) being released and the axial movement of the component assembly optionally causing a radially outwardly directed movement of the shaped parts permitted by the inclined guide tracks (44).

7. Method in accordance with claim 1, wherein sheet metal material is brought by means of the shaped parts (50) into engagement with features of shape (24) providing security against rotation, formed on the functional element (14).

8. Method in accordance with claim 1, wherein the sheet metal part (12) is not perforated and not pierced, at least in the region of the functional element (14) during its attachment to the sheet metal part.

9. Method in accordance with claim 1, wherein a pre-holed sheet metal part is used and/or in that the sheet metal part is pierced during the attachment of the functional element by means of a self-piercing functional element or a preceding hole punch.

10. Die button (10) for the attachment of a functional element having a head end (20) and optionally a shaft part (22) to a sheet metal part (12), optionally in liquid-tight and/or gas-tight form, wherein the die button (10) has a die button body (40) with at least one shaped part (50) movably mounted therein, preferably at least two such shaped parts and also an abutment element (68) biased in the direction towards the sheet metal part for the or each shaped part at the centre of the die button body wherein the or each shaped part (50) forms a wall region of a shaping space (62) which is provided in the die button in the region of its end face confronting the sheet metal part and is guided by a respective obliquely positioned guide track (44) for a radially inwardly directed movement, which leads to the sheet metal material being pressed into a feature of shape (24) and wherein each shaped part (50) is radially supported on a surface (88) of the abutment element (68) during formation of a recess (87) in the sheet metal part which takes place in the shaping space (62) of the die button by pressure exerted onto the head end (20) of the functional element (14) and is hereby prevented from the radially inwardly directed movement so long until the surface (88) of the abutment element (68) against which each shaped part (50) is supported is moved by the said pressure from the head end (20) of the functional element (14) against the bias past the shaped part and has released the radial movement of the shaped part.

11. Die button in accordance with claim 10, wherein after the movement of the abutment element (68) past the shaped part (50), the obliquely disposed guide tracks (44) lead, as a result of the pressure on the sheet metal part, to the radially inwardly directed movement of the shaped parts with simultaneous axial movement of the same.

12. Die button in accordance with claim 10, wherein the axial length of the surface (88) of the abutment element (68) which prevents the shaped parts (50) from the radially inwardly directed movement is so dimensioned that a recess (87) is formed by the head end of a functional element in the shaping space (62) of the sheet metal part at least largely surrounds the head end (20) before the support of the shaped parts at this surface (88) is removed by sliding this surface (88) past the shaped parts and the radial movement of the shaped parts is freed.

13. Die button in accordance with claim 10, wherein the shaped parts (50) are rounded at their surfaces (66) confronting the sheet metal material (12) at a transition into the wall sections (58) forming the shaping space (62).

14. Die button in accordance with claim 10, wherein the shaped parts (50) have, at their surfaces (66) confronting the sheet metal material (12) at the transition into the wall sections (58) forming the shaping space (62), radially inwardly directed projections (64) which press the sheet metal material into features of shape in the form of undercut formed at the head end (20), or at the transition of the head end (20) of the functional element (14) into the shaft part (22).

15. Die button in accordance with claim 10, wherein for each shaped part (50) there is provided a guide track (44) resembling a T-groove inclined towards the longitudinal axis (30) of the die button in which it slides after freeing of the radially inwardly directed movement under the pressure of a plunger (16) and is thus simultaneously axially and radially moved.

16. Die button in accordance with claim 10, wherein the shaping space (62) is also formed by fixedly arranged wall regions (60) of the die button body (40) which are each arranged between two movable shaped parts (50) of the die button.

17. Die button in accordance with claim 16, wherein in a starting state prior to generation of the recess (87) in the sheet metal part, the fixedly arranged wall regions (60) of the die button body are aligned with or offset fractionally in front of or behind the wall regions (58) of the shaped parts (50) which co-define the shaping space (62), whereas, in a closed state of the die button, after the completion of a connection between the functional element and the sheet metal part, they are significantly set back relative to the radially inwardly advanced wall regions (58) of the shaped parts (50) which co-define the shaping space (62).

18. Die button in accordance with claim 10, wherein a spring (72) disposed in a hollow cavity of the die button is provided for the biasing of the abutment element (68) in the axial direction towards the sheet metal part (12).

19. Die button in accordance with claim 18, wherein the abutment element (68) has, at its end confronting the spring (72), a radial shoulder (70) which comes into contact with a shoulder (74) of the die button and hereby limits the maximum movement of the abutment element (68) towards the sheet metal part (12).

20. Die button in accordance with claim 19, wherein the spring (72) is supported at its end remote from the abutment element (68) on an abutment (82) fixed in the die button.

21. Die button in accordance with claim 20, wherein the spring (72) is pre-stressed between the shoulder (70) of the abutment element (68) and a shoulder of the abutment (82).

22. Die button in accordance with claim 20, wherein the abutment (82) is held in a longitudinal bore of the die button by means of a spring ring (84).

23. Die button in accordance with claim 10, wherein the abutment element (68) has a front pin part (76) a free end face (78) of which can be loaded by the head end (20) of a functional element (14), optionally through an intermediary of the sheet metal part, for the axial movement of the abutment element (68).

24. Die button in accordance with claim 10, wherein end faces of the shaped parts (50) confronting the sheet metal part (12) project, up to the conclusion of the radially inwardly directed movement of the shaped parts (50), beyond the end face (46) of the die button (40).

25. Die button in accordance with claim 24, wherein at the conclusion of the radial inwardly directed movement of the shaped parts (50) these are flush with the end face (46) of the die button body.

26. Die button in accordance with claim 10, wherein said features providing security against rotation arc at least one of ribs and grooves.

\* \* \* \* \*